United States Patent [19]

Iizuka

[11] Patent Number: 5,105,923
[45] Date of Patent: Apr. 21, 1992

[54] ENGINE BRAKING CONTROL SYSTEM FOR AUTOMOTIVE AUTOMATIC TRANSMISSIONS

[75] Inventor: Naonori Iizuka, Shizouka, Japan

[73] Assignee: Jatco Corporation, Japan

[21] Appl. No.: 589,026

[22] Filed: Sep. 27, 1990

[51] Int. Cl.$^5$ ............... F16D 43/28; B60K 41/26
[52] U.S. Cl. ...................... 192/4 A; 74/846
[58] Field of Search ............ 192/1.23, 4 A, 9; 74/846

[56] References Cited

U.S. PATENT DOCUMENTS

| | | | |
|---|---|---|---|
| 3,368,426 | 2/1968 | Karig et al. | 192/4 A X |
| 3,426,624 | 2/1969 | Karig et al. | 192/4 A X |
| 3,548,980 | 12/1970 | Schmidt | 192/4 A X |
| 3,628,642 | 12/1971 | Ravenel | 192/4 A X |
| 3,684,066 | 8/1972 | Kubo et al. | 192/4 A |
| 3,700,079 | 11/1972 | Shirai et al. | 192/4 A |
| 3,756,358 | 9/1973 | Espenschied et al. | 192/4 A X |
| 4,113,076 | 9/1978 | Lee et al. | 192/4 A |
| 4,350,234 | 9/1982 | Suga et al. | 192/4 A |
| 4,696,380 | 9/1987 | Kita | 192/4 A |

FOREIGN PATENT DOCUMENTS 56-39349 4/1981 Japan.

Primary Examiner—Rodney H. Bonck
Assistant Examiner—Nicholas Whitelaw
Attorney, Agent, or Firm—Ronald P. Kananen

[57] ABSTRACT

An engine braking control system for automotive automatic transmissions, comprises shift solenoids activated for executing a down-shift operation by selectively engaging or releasing frictional elements of a gear train, in response to engine braking requirements, sensors for monitoring a vehicle speed, an opening angle of a throttle valve, a depression amount of a brake-pedal, and a controller for controlling the down-shift operation on the basis of the signals from the sensors. The controller activates the shift solenoids for executing the down-shift operation only when the throttle opening angle is equal to or less than a predetermined threshold throttle opening angle, the brake-pedal depression amount exceeds a predetermined threshold depression amount and the vehicle speed is less than a predetermined threshold vehicle speed. The controller deactivates the shift solenoids when the throttle opening angle is equal to or less than the predetermined threshold throttle opening angle and the brake-pedal depression speed, derived on the basis of the signal representative of the brake-pedal depression amounts, exceeds a predetermined threshold depression speed.

7 Claims, 2 Drawing Sheets

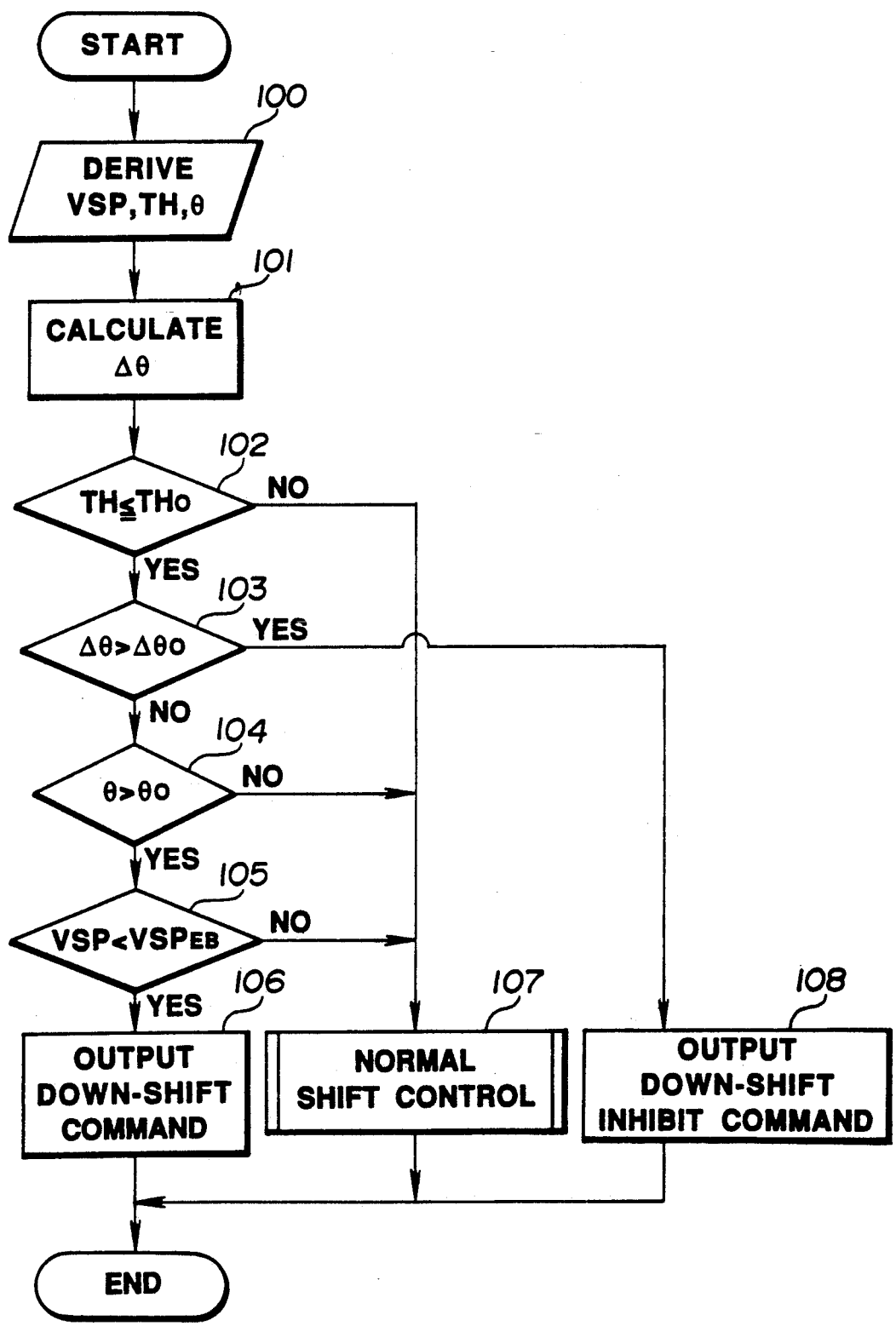

ENGINE BRAKING CONTROL SYSTEM FOR AUTOMOTIVE AUTOMATIC TRANSMISSIONS

BACKGROUND OF THE INVENTION

1. Field of the Invention

The present invention relates to an engine braking control system for automotive automatic transmissions, being capable of applying engine braking as well as wheel braking, during braking operation.

2. Description of the Prior Disclosure

Recently, there have been proposed and developed automotive automatic transmissions having an engine braking control system. One such automatic transmission has been described in Japanese Patent First Publication (Tokkai) Showa 56-39349.

In the aforementioned conventional engine braking control systems, a shift solenoid is activated or deactivated so as to control application of engine braking, depending on the ON and OFF states of a brake switch applied for detecting depression of a brake pedal. Down-shift operation for an automatic transmission is executed as the shift solenoid becomes ON when the brake switch becomes ON under a fully closed state of a throttle valve. In this manner, since a braking requirement is monitored through the brake switch, engine-braking is necessarily applied, as soon as the brake switch becomes ON.

However, in such conventional engine braking control systems, since a brake switch is applied for monitoring depression of a foot-brake pedal, the brake switch will become ON even by a slight depression of the brake-pedal and thereafter a shift solenoid will be activated. As set forth above, engine braking may be applied by a slight depression of the brake-pedal before application of the foot-brake. This results in an uncomfortable feeling for braking operation.

Furthermore, in such conventional engine braking control systems, during quick braking operation, an excessively great braking force may be applied to vehicle wheels due to the sum of braking forces generated by both of the foot-brake and engine braking and therefore the wheels are rapidly decelerated. Under these conditions, there is a tendency for wheel-lock to occur.

SUMMARY OF THE INVENTION

It is therefore, in view of the above disadvantages, an object of the present invention to provide an engine braking control system for automotive automatic transmissions, applying engine braking by down-shifting, which can provide a comfortable feeling during normal braking operation.

It is another object of the invention, to provide an engine braking control system for automotive automatic transmissions which can prevent wheel-lock due to quick depression of a brake-pedal, during quick braking operation.

In order to accomplish the aforementioned and other objects, an engine braking control system for an automotive automatic transmission, comprises shift solenoids activated for executing a down-shift operation by selectively engaging or releasing frictional elements for a gear train, in response to an engine braking requirement, sensor means for monitoring a vehicle speed, an opening angle of a throttle valve, and a depression amount of a brake-pedal, the sensor means generating signals respectively representative of the vehicle speed, the throttle valve opening angle and the brake-pedal depression amount, and engine braking control means for controlling the down-shift operation on the basis of the signals from the sensor means such that the control means activates the shift solenoids only when the throttle opening angle is equal to or less than a predetermined threshold throttle opening angle essentially equivalent to a fully closed state of the throttle valve and the brake-pedal depression amount exceeds a predetermined threshold depression amount and the vehicle speed is less than a predetermined threshold vehicle speed.

The engine braking control system further comprises means for deriving a depression speed of the brake pedal on the basis of the signals representative of at least two brake-pedal depression amounts. The control means deactivates the shift solenoids when the throttle opening angle is equal to or less than the predetermined threshold throttle opening angle and the brake-pedal depression speed exceeds a predetermined threshold depression speed. The sensor means generally includes three sensors applied for respectively monitoring the vehicle speed, the throttle opening angle and the brake-pedal depression amount. The sensor for monitoring the throttle opening angle may include a throttle switch for monitoring a fully closed state of the throttle valve. The sensor for monitoring the brake-pedal depression amount may include a brake fluid pressure sensor for monitoring brake fluid pressure or a brake-pedal depression force sensor for monitoring depression force for the brake-pedal. The brake-pedal depression speed deriving means derives the depression speed for the brake-pedal on the basis of a current brake-pedal depression amount, a prior brake-pedal depression amount and a predetermined control period by which the prior depression amount precedes the current depression amount.

According to another aspect of the invention, a method for controlling engine braking for an automotive automatic transmission including shift solenoids activated for executing a down-shift operation by selectively engaging or releasing frictional elements for a gear train in response to an engine braking requirement, comprises the steps of (a) deriving a vehicle speed, an opening angle of a throttle valve, and a depression amount of a brake-pedal, from signals output from sensor means for monitoring the vehicle speed, the throttle opening angle, and the brake-pedal depression amount, (b) calculating a depression speed of the brake-pedal on the basis of the signals representative of at least two brake-pedal depression amounts, (c) comparing the throttle opening angle with a predetermined threshold throttle opening angle, (d) comparing the brake-pedal depression speed with a predetermined threshold depression speed, (e) comparing the brake-pedal depression amount with a predetermined threshold depression amount, (f) comparing the vehicle speed with a predetermined threshold vehicle speed, (g) outputting a command signal to the shift solenoids for executing the down-shift operation, when the throttle opening angle is equal to or less than the predetermined threshold throttle opening angle, the brake-pedal depression speed is equal to or less than the predetermined threshold brake-pedal depression speed, the brake-pedal depression amount exceeds the predetermined threshold brake-pedal depression amount, and the vehicle speed is less than the predetermined threshold vehicle speed, and (h) outputting a command signal to the shift solenoids for deactivating the shift solenoids when the throttle opening angle is equal to or less than the predetermined threshold throttle opening angle and the brake-pedal depression speed exceeds the predetermined threshold depression speed.

BRIEF DESCRIPTION OF THE DRAWINGS

FIG. 2 is a flow chart showing the control operation of the engine braking control system according to the embodiment shown in FIG. 1.

DESCRIPTION OF THE PREFERRED EMBODIMENT

Figure 1:
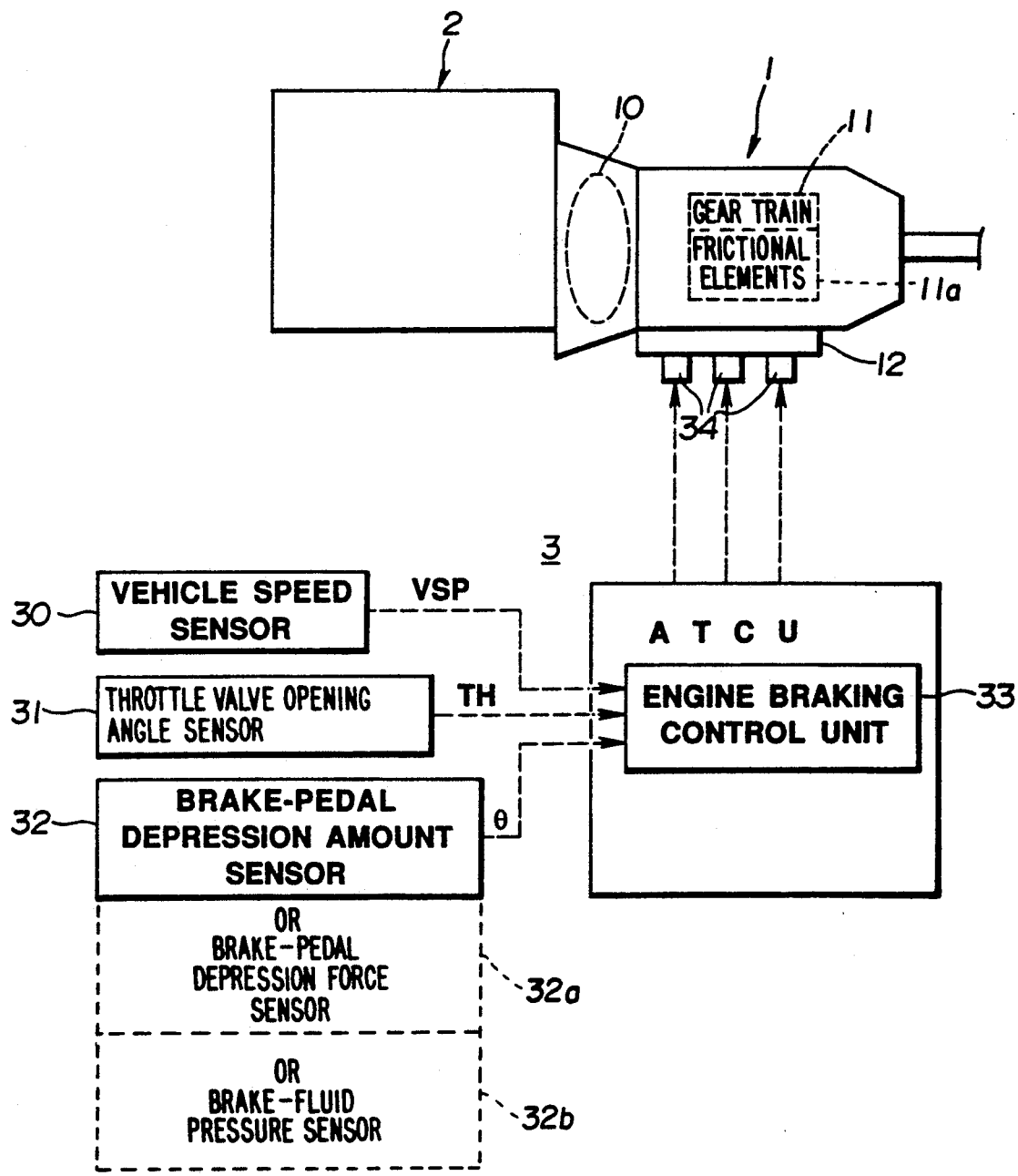
FIG. 1 is a system diagram illustrating an engine braking control system for automotive automatic transmissions of a preferred embodiment according to the invention.

Referring now to FIGS. 1 and 2, particularly to FIG. 1, an input shaft of an automotive automatic transmission 1 is connected to an engine crankshaft of an engine 2, in a conventional manner. The transmission 1 is comprised of a torque converter 10 having a torque increasing action in a low engine speed range, a gear train 11 including a plurality of planetary gearsets, and a hydraulic control valve assembly 12 generating control pressure applied for engaging or releasing frictional elements 11a for the gear train 11, such as a one-way clutch, a band-brake or the like which are selected depending on a required shift position. The automatic transmission 1 employs an engine braking control system 3 used for applying engine braking by forcible down-shift under predetermined conditions hereinafter described in detail.

The engine braking control system 3 includes various sensors, namely a vehicle speed sensor 30, a throttle valve opening angle sensor 31, and a brake-pedal depression amount sensor 32, respectively outputting input information. The vehicle speed sensor 30 is applied for monitoring a vehicle speed, (herein abbreviated to VSP), the throttle opening angle sensor 31 is applied for monitoring a throttle valve opening angle, (herein abbreviated to TH), including a fully closed throttle opening angle, while the brake-pedal depression amount sensor 32 is applied for monitoring a depression amount $\theta$ of a brake-pedal for a foot-brake, for example. The throttle valve opening angle sensor 31 may be replaced with a throttle switch for monitoring a fully closed state of the throttle valve. The brake-pedal depression amount sensor 32 may also be replaced with a brake fluid pressure sensor 32b for monitoring brake fluid pressure or with a brake-pedal depression force sensor 32a for monitoring a depression force applied to the brake-pedal. The engine braking control system 3 also includes an engine braking control unit 33 assembled in an automatic transmission control unit ATCU, which ATCU is provided for executing a whole control of the automatic transmission, and a series of shift solenoids 34, each serving as a control actuator assembled in the hydraulic control valve assembly 12.

The operation of the engine braking control unit 33 will be described hereinbelow in detail in accordance with a flow-chart shown in FIG. 2.

In step 100, the control unit 33 derives a vehicle speed VSP from the sensor 30, a throttle opening angle TH from the sensor 31, and a brake-pedal depression amount $\theta$ from the sensor 32.

In step 101, the control unit 33 calculates a depression speed $\Delta \theta$ for the brake-pedal on the basis of a currently derived brake-pedal depression amount $\theta_1$ and a prior brake-pedal depression amount $\theta_0$ which is derived prior to the current brake-pedal depression amount $\theta_1$ by a predetermined control period $\Delta t$.

In step 102, a test is made to determine whether or not the throttle opening angle TH is within a throttle valve fully closed range, wherein the throttle valve is essentially closed, the valve angle being less than a predetermined opening angle $TH_o$. If the answer in step 102 is NO, step 107 proceeds wherein a normal shift control is executed in response to vehicle speed and engine load. Conversely, if the answer in step 102 is YES, step 103 proceeds wherein a test is made to determine whether the depression speed $\Delta \theta$ exceeds a preset brake-pedal depression speed $\Delta \theta_o$ corresponding to a threshold value used as a factor determining whether or not quick braking occurs. If the answer in step 103 is YES, step 108 proceeds whether the control unit 33 outputs a control command to the shift solenoids 34 to inhibit down-shift operation. If the answer in step 103 is NO, that is the depression speed $\Delta \theta$ is equal to or less than the threshold depression speed $\Delta \theta_o$, step 104 proceeds wherein the brake-pedal depression amount $\theta$ exceeds a preset brake-pedal depression amount $\theta_o$ corresponding to a threshold value used as a factor determining whether or not the engine braking control should be executed. If the answer in step 104 is NO, step 107 proceeds wherein the normal shift control is executed, while if the answer in step 104 is YES, step 105 proceeds.

In step 105, the vehicle speed VSP is compared with a preset vehicle speed $VSP_{EB}$ corresponding to a threshold value used as a factor determining whether or not engine braking control should be executed. If the vehicle speed VSP is equal to or greater than the threshold vehicle speed $VSP_{EB}$, step 107 proceeds and the previously described normal shift control is executed. If the vehicle speed VSP is less than the threshold vehicle speed $VSP_{EB}$, step 106 proceeds wherein the control unit 33 outputs a control command to the shift solenoids 34 to execute down-shift operation in a manner so as to change to a new shift position down from the current shift position.

The engine braking control unit 33 actually op in accordance with two different braking operations, normal braking operation wherein the brake-pedal is mode depressed when the vehicle is running and a quick b operation wherein the brake-pedal is quickly depressed wh vehicle is running, as detailed hereinafter.

At the beginning of moderate, normal b operation, the engine braking control unit 33 execut initial procedure going from step 100 to step 107 through 101, 102, 103 and 104, in that order. Thereafter, as sc the brake-pedal depression amount $\theta$ is gradually increase the depression amount $\theta$ reaches and/or exceeds the thre depression amount $\theta_o$, a new procedure is executed in s manner as to enter step 105 after step 104. In step 10 the vehicle speed VSP is equal to or greater than the thre vehicle speed $VSP_{EB}$, step 107 proceeds subsequently to ste so as to execute normal shift control. Conversely, braking force is effectively applied to vehicle wheels moderate braking operation and as a result the vehicle VSP becomes less than the threshold vehicle speed $VSP_{EB}$, step 106 proceeds so as to apply engine braking through down-shift command. In the previously described manner, during the normal braking operation, braking force including engine braking is applied after application of a foot-brake, that wheel-braking is of a higher priority than engine braking.

During quick braking operation, since the brake-p depression speed $\Delta \theta$ is extremely quick, the procedure en step 108 subsequently to step 103, when the depression spe $\theta$ exceeds the threshold depression speed $\Delta \theta_o$. That is, the engine braking control unit 33 executes procedure going from step 100 to step 108 through steps 102 and 103 in that order, so as to inhibit down-s operation of the shift solenoids 34. Therefore, during q braking operation, engine braking is not applied but only foot-brake is applied to the vehicle wheels, thereby prevent excessive braking force to the wheels. As a result, wheel-l may be effectively avoided.

In general, a constant value can be used as the previously described threshold value, such as the threshold brake-pedal depression amount $\theta_o$ or the threshold vehicle speed $VSP_{EB}$. Alternatively, to enhance accuracy of engine braking control, it is desirable to use a variable value derived through learning control procedure in consideration of a relationship between the actual generated braking force and the actual brake-pedal depression amount which relationship may be varied as time is elapsed. That is, the threshold depression amount $\theta_o$ may be variably determined on the basis of functional data exhibiting a relationship between the actual brake-pedal depression amount and the actual deceleration of the vehicle, while cyclically monitoring the functional data. Furthermore, to improve the timing for application of engine braking, it is desirable to use a variable value, selected in response to the present vehicle speed, as a threshold vehicle speed $VSP_{EB}$.

While the foregoing is a description of the preferred embodiment for carrying out the invention, it will be understood that the invention is not limited to the particular embodiment shown and described herein, but may include variations and modifications without departing from the scope or spirit of this invention as described by the following claims.

What is claimed is:

1. An engine braking control system for an automotive automatic transmission, comprising:

shift solenoids activated for executing a down-shift operation by selectively engaging or releasing frictional elements for a gear train, in response to an engine braking requirement;

sensor means for monitoring a vehicle speed, an opening angle of a throttle valve, and a depression amount of a brake-pedal, said sensor means generating signals respectively representative of the vehicle speed, the throttle valve opening angle and the brake-pedal depression amount; and engine braking control means for controlling said down-shift operation on the basis of the signals from said sensor means such that said control means activates said shift solenoids so as to shift to a lower gear ratio for said engine braking requirement only when the throttle valve opening angle, the brake-pedal depression amount, and the vehicle speed satisfy their respective conditions, namely a first predetermined condition wherein the throttle opening angle is equal to or less than a predetermined threshold throttle opening angle, a second predetermined condition wherein the brake-pedal depression amount exceeds a predetermined threshold depression amount, and a third predetermined condition wherein the vehicle speed becomes less than a predetermined threshold vehicle speed;

whereby a braking force which includes engine braking is applied after application of a foot-brake.

2. An engine braking control system for an automotive automatic transmission, comprising:

shift solenoids activated for executing a down-shift operation by selectively engaging or releasing frictional elements for a gear train, in response to an engine braking requirement;

sensor means for monitoring a vehicle speed, an opening angle of a throttle valuve, and a depression amount of a brake-pedal, said sensor means generating signals respectively representative of the vehicle speed, the throttle valve opening angle and the brake-pedal depression amount; and engine braking control means for controlling said down-shift operation on the basis of the signals from said sensor means such that said control means activates said shift solenoids so as to shift to lower gear ratio for said engine braking requirement only when the throttle valve opening angle, the brake-pedal depression amount, and the vehicle speed satisfy their respective conditions, namely a first predetermined condition wherein the throttle opening angle is equal to or less than a predetermined threshold throttle opening angle, a second predetermined condition wherein the brake-pedal depression amount exceeds a predetermined threshold depression amount, and a third predetermined condition wherein the vehicle speed becomes less than a predetermined threshold vehicle speed;

means for deriving a depression speed of the brake-pedal on the basis of the signals representative of at least two brake-pedal depression amounts, said control means deactivating said shift solenoids when the throttle opening angle is equal to or less than the predetermined threshold throttle opening angle and the brake-pedal depression speed exceeds a predetermined threshold depression speed;

whereby a braking force which includes engine braking is applied after application of a foot-brake and said down-shift operation is inhibited during a quick braking operation.

3. The engine braking control system as set forth in claim 1, wherein said sensor for monitoring the throttle opening angle includes a throttle switch for monitoring a fully closed state of the throttle valve.

4. The engine braking control system as set forth in claim 1, wherein said sensor for monitoring the brake-pedal depression amount includes a brake fluid pressure sensor for monitoring brake fluid pressure or a brake-pedal depression force sensor for monitoring depression force applied to the brake-pedal.

5. The engine braking control system as set forth in claim 2, wherein said brake-pedal depression speed deriving means derives the depression speed of the brake-pedal on the basis of a current brake-pedal depression amount, a prior brake-pedal depression amount and a predetermined control period by which said prior brake-pedal depression amount precedes said current brake-pedal depression amount.

6. A method for controlling engine braking for an automotive automatic transmission including shift solenoids activated for executing a down-shift operation by selectively engaging or releasing frictional elements for a gear train, in response to an engine braking requirement, comprising the steps of:
- (a) deriving a vehicle speed, an opening angle of a throttle valve, and a depression amount of a brake-pedal, from signals output from sensor means for monitoring the vehicle speed, the throttle opening angle, and the brake-pedal depression amount;
- (b) calculating a depression speed of the brake-pedal on the basis of the signals representative of at least two brake-pedal depression amounts;
- (c) comparing the throttle opening angle with a predetermined threshold throttle opening angle;
- (d) comparing the brake-pedal depression speed with a predetermined threshold depression speed;
- (e) comparing the brake-pedal depression amount with a predetermined threshold depression amount;
- (f) comparing the vehicle speed with a predetermined threshold vehicle speed;
- (g) outputting a command signal to the shift solenoids for executing the down-shift operation, when the throttle opening angle is equal to or less than the predetermined threshold throttle opening angle, the brake-pedal depression speed is equal to or less than the predetermined threshold brake-pedal depression speed, the brake-pedal depression amount exceeds the predetermined threshold brake-pedal depression amount, and the vehicle speed is less than the predetermined threshold vehicle speed; and
- (h) outputting a command signal to the shift solenoids for deactivating said shift solenoids when the throttle opening angle is equal to or less than the predetermined threshold throttle opening angle and the brake-pedal depression speed exceeds the predetermined threshold depression speed.

7. The method for controlling an engine braking for automotive automatic transmissions as defined by claim 6, wherein said step of calculating the depression speed of the brake-pedal comprises; deriving the depression speed of the brake-pedal on the basis of a current brake-pedal depression amount, a prior brake-pedal depression amount and a predetermined control period by which said prior brake-pedal depression amount precedes said current brake-pedal amount.

* * * * *